(12) United States Patent
Fujiwara et al.

(10) Patent No.: US 7,587,094 B2
(45) Date of Patent: Sep. 8, 2009

(54) PHASE MEASUREMENT SYSTEM (75) Inventors: Koji Fujiwara, Mishima-gun (JP); Takanobu Ojima, Amagasaki (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 430 days.

(21) Appl. No.: 11/150,061

(22) Filed: Jun. 10, 2005

(65) Prior Publication Data
US 2005/0280831 A1 Dec. 22, 2005

(30) Foreign Application Priority Data
Jun. 17, 2004 (JP) .............................. 2004-179829

(51) Int. Cl.
*G06K 9/40* (2006.01)
(52) U.S. Cl. ..................... 382/254; 382/154; 356/376
(58) Field of Classification Search ................. 382/254, 382/154
See application file for complete search history.

(56) References Cited

U.S. PATENT DOCUMENTS

| | | | | |
|---|---|---|---|---|
| 5,561,526 A | * | 10/1996 | Huber et al. | 356/604 |
| 5,684,890 A | * | 11/1997 | Miyashita et al. | 382/154 |
| 6,075,605 A | | 6/2000 | Futamura et al. | 356/376 |
| 6,559,954 B2 | * | 5/2003 | Takata et al. | 356/604 |
| 6,788,210 B1 | * | 9/2004 | Huang et al. | 340/612 |
| 6,873,421 B2 | * | 3/2005 | Lim et al. | 356/605 |
| 2003/0026475 A1 | * | 2/2003 | Yahashi et al. | 382/154 |
| 2004/0151369 A1 | * | 8/2004 | Schwotzer | 382/154 |

FOREIGN PATENT DOCUMENTS

| | | |
|---|---|---|
| JP | 10-96606 A | 4/1998 |
| JP | 2001-108422 A | 4/2001 |

* cited by examiner

*Primary Examiner*—Samir A. Ahmed
*Assistant Examiner*—Tsung-Yin Tsai
(74) *Attorney, Agent, or Firm*—Sidley Austin LLP (57) ABSTRACT

A reference image of a pattern having a first pitch and projected on a sample 1 by a projector 6 is captured by a camera 5. Next, a measuring image of a pattern having a second pitch and projected on the sample 1 by the projector 6 is captured by the camera 5. Here, the second pitch of the pattern light is determined by a value calculated based on the phase resolution of the pattern light having the first pitch. Then, using the reference image thus obtained, phase coupling for the measuring image is performed. The three-dimensional shape of the sample is obtained in this manner.

8 Claims, 4 Drawing Sheets

PHASE MEASUREMENT SYSTEM

This application is based on application No. 2004-179829 filed in Japan, the content of which is hereby incorporated by reference.

BACKGROUND OF THE INVENTION

1. Field of the Invention

The present invention relates to a phase measurement system which may be advantageously used, for example, in the measurement of a three-dimensional shape for measuring the shape of a sample by projecting pattern light on the sample and by processing image information obtained by capturing its optical image.

2. Description of the Related Art

As a noncontact method for the measurement of an object's three-dimensional shape, a method called the grating projection method which analyzes the phase distribution obtained from the grating pattern projected on the object is well known in the prior art. The basic components of a measurement apparatus implementing this method are a three-dimensional object (sample), a projector, and a camera. In this arrangement, the camera is disposed in a horizontal plane containing the approximate centers of the projector and the sample, and is placed at a position spaced apart from the projector.

The most important process in the grating projection method is the process of obtaining the phase of an optical image of the sample from the sample itself or from the pattern displayed or projected on the sample. For example, suppose that a periodic grating pattern is projected from the projector onto the sample. Then, an image (projection image) of the sample on which the grating pattern is projected is captured by the camera. Here, images are taken successively by shifting the phase of the grating pattern in small increments. Then, a phase image is obtained by applying a Fourier transform to the thus obtained projection images. This method is called the Fourier transform phase shift method.

However, since a periodic function such as the grating pattern is Fourier transformed, the obtained phase takes any one value within the range of $2\pi$ (0 to $2\pi$, $-\pi$ to $\pi$, etc.). Then, the phase discontinuously changes by $2\pi$, and phase aliasing thus occurs. Accordingly, since, in this condition, the depth cannot be determined uniquely, the phase must be corrected by using a step function synchronized to the phase aliasing. That is, processing must be applied so that the phase changes continuously and monotonically without exhibiting phase aliasing. This processing is called phase coupling.

Phase coupling is disclosed in Japanese Unexamined Patent Publication No. 2001-108422. The phase coupling disclosed in this document is performed by utilizing the property that the combined pitch given by the linear sum of patterns having different pitches (each corresponding to the wavelength of a periodic function) is the least common multiple of the individual pitches. For example, the combined pitch of a pattern whose pitch is 2 (wavelength is twice the unit length) and a pattern whose pitch is 3 (wavelength is three times the unit length) is 6 (wavelength is six times the unit length) which is the least common multiple of 2 and 3. This method accomplishes the phase coupling without explicitly generating a step function.

Phase coupling is also disclosed in U.S. Pat. No. 6,075,605. The phase coupling disclosed in this patent document is performed by explicitly generating a step function by using a space coding pattern method in conjunction with a phase shift method. In this case, using coarse space data obtained by the space coding pattern method, the phases obtained by the phase shift method are coupled to obtain accurate three-dimensional measurement results. Here, the space coding pattern method is a method that obtains the three-dimensional shape of a sample by using space code numbers assigned to the space on which pattern light is projected.

SUMMARY OF THE INVENTION

However, in the method disclosed in Japanese Unexamined Patent Publication No. 2001-108422, the amount of phase shift is the same for all patterns even when the patterns have different pitches. That is, the resolution with which the phase is obtained from a captured image is the same regardless of the pattern pitch. This means that the number of input images required is equal to the number of images required for each pitch multiplied by the number of kinds of pitches. This method, therefore, has had the problem that, if an accurate phase image is to be obtained, the number of sample images to be stored increases, which not only requires a larger memory capacity but greatly increases the measurement time. However, what is needed for phase coupling is to obtain the step function for phase correction. This only requires the resolution just enough to distinguish each step of the step function.

On the other hand, the method disclosed in U.S. Pat. No. 6,075,605 has the problem that the configuration of the apparatus becomes complex because the space coding pattern method for obtaining the step function is used in conjunction with the phase shift method used for accurate measurement of the sample shape.

The present invention has been devised in view of the above situation, and an object of the invention is to reduce the number of input images and shorten the measurement time required to measure the three-dimensional shape of a sample, while retaining the resolution capable of distinguishing each step of the step function needed for phase coupling.

To achieve the above object, according to one aspect of the present invention, there is provide a phase measurement system using a phase shift method, comprising: a pattern light projector which projects periodic pattern light on a sample; an image capturing device which captures an image of the pattern light projected on the sample by the pattern light projector; a first reference image memory which stores a first reference image, captured by the image capturing device, of pattern light having a first pitch; a measuring image memory which stores a measuring image, captured by the image capturing device, of pattern light having a second pitch that is equal to or smaller than a value calculated based on the phase resolution of the pattern light having the first pitch; a phase data converter which converts the first reference image and the measuring image into respective phase data; a first reference phase image memory which stores a first reference phase image as representing the phase data of the first reference image converted by the phase data converter; a measuring phase image memory which stores a measuring phase image as representing the phase data of the measuring image converted by the phase data converter; and a phase coupler which corrects the measuring phase image based on the first reference phase image.

In the above configuration, first the periodic pattern light having the first pitch is projected on the sample by the pattern light projector. Here, the periodic light pattern is a beam of light having an illuminance distribution such as defined by a triangular wave, a rectangular wave, or a sine wave or the like. The optical image on the sample is captured by the image capturing device, and stored as the reference image in the first reference image memory.

Next, the periodic pattern light having the second pitch is projected on the sample by the pattern light projector. The optical image on the sample is captured by the image capturing device, and stored as the measuring image in the measuring image memory. Here, the second pitch of the pattern light is determined by the value calculated based on the phase resolution of the pattern light having the first pitch. That is, in the phase shift method, the process of projecting pattern light having a prescribed pitch and then capturing the reference image is performed repeatedly while shifting the phase of the pattern light. When the number of phase shifts is denoted by N, the phase data obtained by analyzing the phase of the reference image has a phase resolution that depends on N.

For example, when a Fourier transform is used for the phase analysis, the phase resolution is proportional to 1/N. Accordingly, if the resolution of the phase data obtained by using the pattern light having the first pitch is smaller than the step of phase aliasing obtained by using the pattern light having the second pitch, then the step can be discriminated. Accordingly, the phase of the pattern light having the second pitch can be corrected using the pattern light having the first pitch. In other words, the number of phase shifts for the pattern light having the first pitch can be reduced to such an extent that the phase resolution of the pattern light having the first pitch becomes smaller than the step of phase aliasing obtained by using the pattern light having the second pitch.

A rough phase image of the sample is created by performing image-capturing using the pattern light having the first pitch and shifting its phase a minimum required number of times; on the other hand, image-capturing is performed using the pattern light having the second pitch, and an accurate three-dimensional shape of the sample can thus be obtained. Accordingly, the number of first reference images can be reduced to the minimum required, eliminating the need for any extra image input.

The first reference image and the measuring image thus obtained are respectively converted into phase data by the phase data converter. The phase data of the first reference image is stored as the first reference phase image in the first reference phase image memory. Likewise, the phase data of the measuring image is stored as the measuring phase image in the measuring phase image memory. However, the phase data obtained here is discontinuous in steps of $2\pi$, because the data is obtained by converting the periodic pattern light. Accordingly, for the measurement of a three-dimensional shape or the like, correction must be applied to make the phase continuous (phase coupling). Therefore, the phase coupler corrects the measuring phase image based on the first reference phase image.

According to the above system, it becomes possible to reduce the measurement time required, for example, for the measurement of a three-dimensional shape. In the process of obtaining measurement data of the sample, the operation of projecting prescribed pattern light and capturing its image has to be performed repeatedly while sequentially shifting the phase of the pattern light. Accordingly, this process has been the most time consuming process in the measurement of a three-dimensional shape. In the above system, since the number of input images of the pattern light having the first pitch can be reduced to the minimum required, the measurement time for the sample can be reduced. Furthermore, since the amount of data to be stored decreases, the required memory capacity can be reduced.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Phase resolution depends on the number, N, of phase shifts performed when inputting the images based on which to obtain the phase. Up to the point where the amount of phase shift is approximately equal to the pixel pitch, the phase resolution is higher as N is larger. Relative resolution a to the brightness amplitude of a projection pattern (resolution which is a times the brightness amplitude) is also a factor that determines the phase resolution. Here, when a beam of light of relative resolution $\sigma$ is projected and images are captured by shifting the phase of the light N times, the phase obtained from these images is considered to have a theoretical resolution proportional to $\sigma/N$.

Accordingly, if this level of resolution can be obtained as a reference phase, a measuring phase having a longer pitch can be corrected. That is, for any measuring phase in which phase aliasing occurs at a pitch longer than $\sigma/N$ times the pitch of the reference phase, phase coupling can be accomplished using the reference phase. In reality, the reference phase resolution drops due to noise introduced during the measurement. However, by performing a phase analysis using the Fourier transform phase shift method, the resolution drop can be held within a given value.

From the above discussion, it is desirable that the reference pattern light having the first pitch be chosen to have the larger pitch $p_2$ so that its phase can be uniquely determined within the field of view of the camera, and that the measuring pattern light having the second pitch be chosen to have the smaller pitch $p_1$ in order to increase the measuring accuracy. With this arrangement, the number, N, of shifts required when measuring the reference phase can be reduced to about $p_2\sigma/p_1$.

To increase the measuring accuracy in optical measurement of a three-dimensional shape, it is desirable to increase the ratio of the signal component to the dynamic range of the image input apparatus. To increase the ratio of the signal component, optimum exposure control that matches the reflectivity distribution of the sample must be performed. However, usually the reflectivity distribution of the sample is not readily known. Further, since the illuminance of the projector beam projected on the sample depends on the distance to the surface of the sample, it is difficult to perform proper exposure control, etc. by controlling the illuminance to an optimum value.

In the configuration described hereinafter, the reference pattern projection is performed in advance. By so doing, the reflectivity at each region of the sample (i.e., at each region of the image) and the phase of the projector beam projected on the sample (or approximate three-dimensional shape of the sample) can be obtained in advance. Then, the intensity of the projector beam to be projected is controlled to an optimum value for each region of the sample (for each pitch of the measuring phase).

Figure 1:
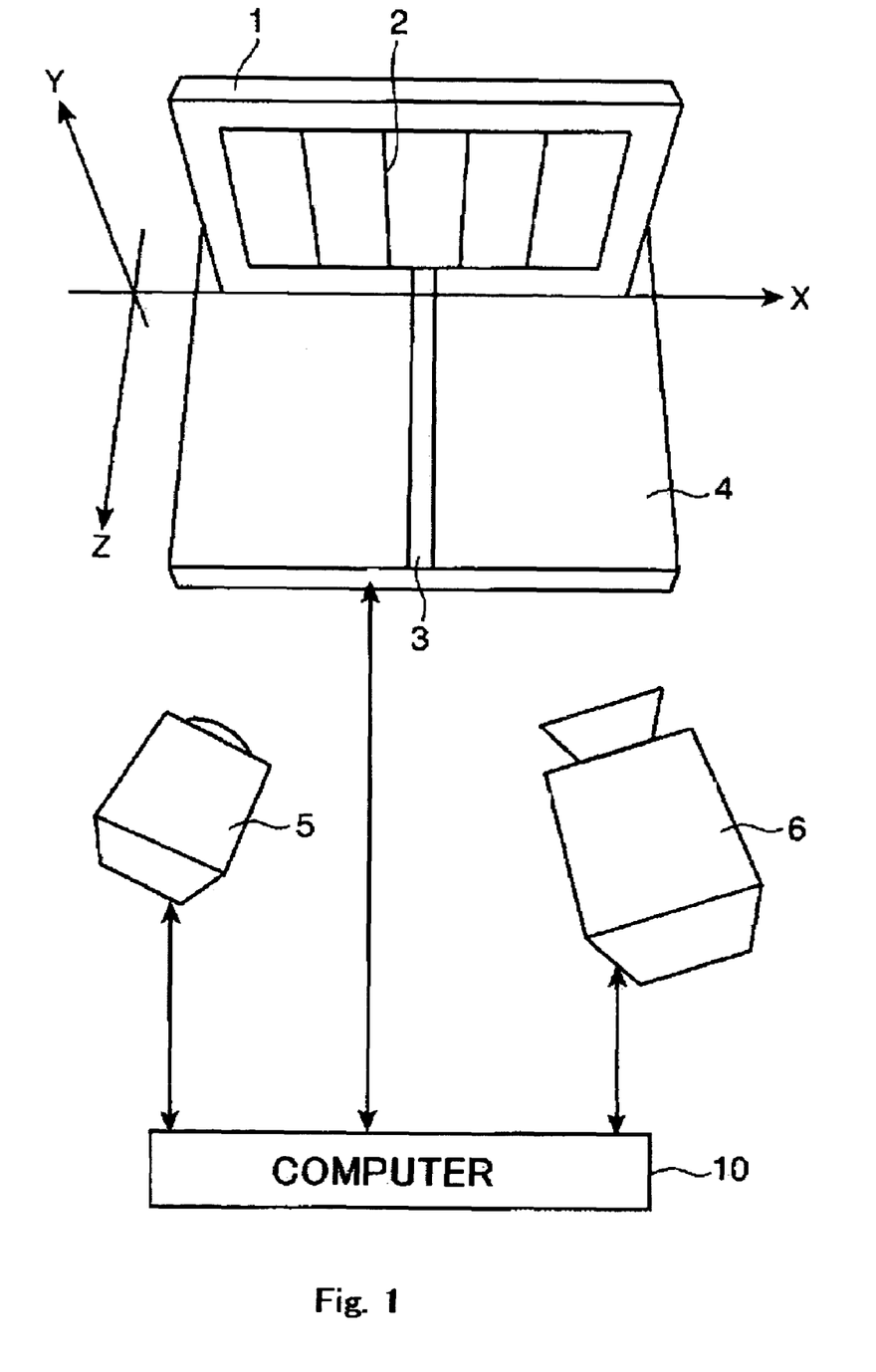
FIG. 1 is an arrangement diagram showing the positional relationship between a camera, a projector, and a sample in a phase measurement system according to one embodiment of the present invention.

A phase measurement system will be described below with reference to the drawings. First, the positional relationship between a camera, a projector, and a sample in the phase measurement system will be described with reference to FIG. 1. This system comprises: the sample 1 mounted on a single-axis table 3 installed on the upper surface of a base 4; the camera 5 and the projector 6 disposed on the display (or projected) side of the sample 1 (i.e., on the frontward side in the figure); and a computer 10 which controls the forward and backward movements of the sample 1 on the base 4 as well as the operation of the camera 5 and the projector 6. In FIG. 1, the sample 1 is connected to the computer 10 via the base 4.

The sample 1 is, for example, a display device such as an LCD (Liquid Crystal Display), and is moved along the longitudinal direction of the single-axis table 3. In this case, it is desirable that the direction of the normal to the sample 1 coincide with the longitudinal direction of the single-axis table 3. The sample 1 can then be moved in the single-axis direction perpendicular to its surface. The sample 1 includes a display part for displaying a prescribed pattern thereon, and the display part is constructed to be able to display or not display the prescribed pattern under the control of a signal from the computer 10.

A measuring pattern 2 is a periodic pattern which is projected on the sample 1 when creating measurement data. Any periodic function such as triangular or rectangular can be used as the measuring pattern 2, but since a Fourier transform is used when obtaining the phase from the captured images, it is preferable to use a sine function. In the case of a sine function, since the Fourier transform yields only one frequency, noise can be easily removed. On the other hand, in the case of a periodic function such as triangular or rectangular, the Fourier transform yields more than one frequency, tending to make it correspondingly difficult to discriminate noise.

In FIG. 1, a plurality of equispaced straight lines extending in Y direction are drawn as the measuring pattern 2. These straight lines indicate portions of the highest brightness.

In this specification, the image in this direction is referred to as the X image, while straight lines extending in X direction perpendicular to the above direction are referred to as the Y image. The images are so named because, in the case of the X image, for example, the phase of the measuring pattern changes along the X direction.

The single-axis table 3 serves as a guide when the sample 1 is moved along the longitudinal direction of the single-axis table 3. The single-axis table 3 has a calibrated scale, and the position of the sample 1 on the base 4 is measured by reading the value on the calibrated scale.

The base 4 drives the sample 1 along the longitudinal direction of the single-axis table 3 under the control of a signal from the computer 10.

The projector 6 (pattern light projector) is a device for projecting periodic pattern light on the sample 1. The shape, pitch, projecting position, etc. of the pattern are controlled by the computer 10, and the pattern is projected in the form of the light emitted from the light source contained in the projector 6. It is therefore desirable that the projector 6 be fixed at a position from which the light can be projected on substantially the entire surface of the display part of the sample 1. Further, the projector 6 is equipped with a shutter function so that the shutter can be opened and closed under the control of a signal from the computer 10. Here, the periodic pattern may be drawn on a projection slide mounted on a two-axis microstage. In this way, the positions of the reference and measuring patterns (collectively called the projection patterns) are adjusted.

The camera 5 (image capturing device) comprises a semiconductor device such as a CCD (Charge Coupled Device) or CMOS (Complementary Metal Oxide Semiconductor) as an imaging device, and converts a captured image into an electrical signal which is stored as digital data on a pixel by pixel basis. The image of the measuring pattern 2 projected on the sample 1 is taken (photographed) by this camera 5. It is therefore desirable that the camera 5 be fixed at a position from which substantially the entire surface of the display part of the sample 1 can be taken. Further, the camera 5 is constructed to input images under the control of a signal from the computer 10.

The computer 10 is connected to the sample 1, the base 4, the camera 5, and the projector 6 to control their functions. Images captured by the camera 5 are loaded into the computer 10 which performs various operations such as phase calculations based on the images.

To facilitate the setting, it is desirable that the center of the sample 1, the focal point of the camera 5, and the projection center of the projector 6 be located in substantially the same plane. In the present embodiment, it is understood that this plane is parallel to the upper surface of the base 4. Hereinafter, in this specification, the direction of the normal to the sample 1 is taken as the Z direction, and the X and Y directions perpendicular to the Z direction are set in the plane of the sample 1, as shown in FIG. 1. Accordingly, the X direction lies in the plane that passes through the centers of the sample 1, the camera 5, and the projector 6, and the Y direction is the direction perpendicular (normal) to this plane.

With this arrangement, the measurement of a three-dimensional shape or the phase coupling as a preparatory step is performed; first, an outline of the measurement procedure will be described with reference to the flow chart of FIG. 2. The operation mode of the present system can be roughly classified into a reference mode using the sample 1 for obtaining the step function used when performing the phase coupling and a measurement mode for accurately measuring the shape of the actual sample, that is, an object to be actually measured. The embodiment will be described below in connection with these operation modes. The description will be given by also referring to FIGS. 3 and 4 where necessary.

First, pattern light of pitch $p_2$, which covers the entire field of view of the camera with one pitch, is projected on the sample 1. Then, the phase is shifted successively in the X direction, and its reference image is input ((S1) in FIG. 2). If the number of phase shifts is $N_2$, the number, $N_2$, of reference images are obtained. Next, the phase is shifted in the Y direction in like manner, and its image is input ((S2) in FIG. 2). Then, a Fourier transform is applied to the images obtained in (S1) and (S2), and at the same time, the fundamental frequency is extracted ((S3) in FIG. 2). A reference phase image is thus created.

Figure 2:
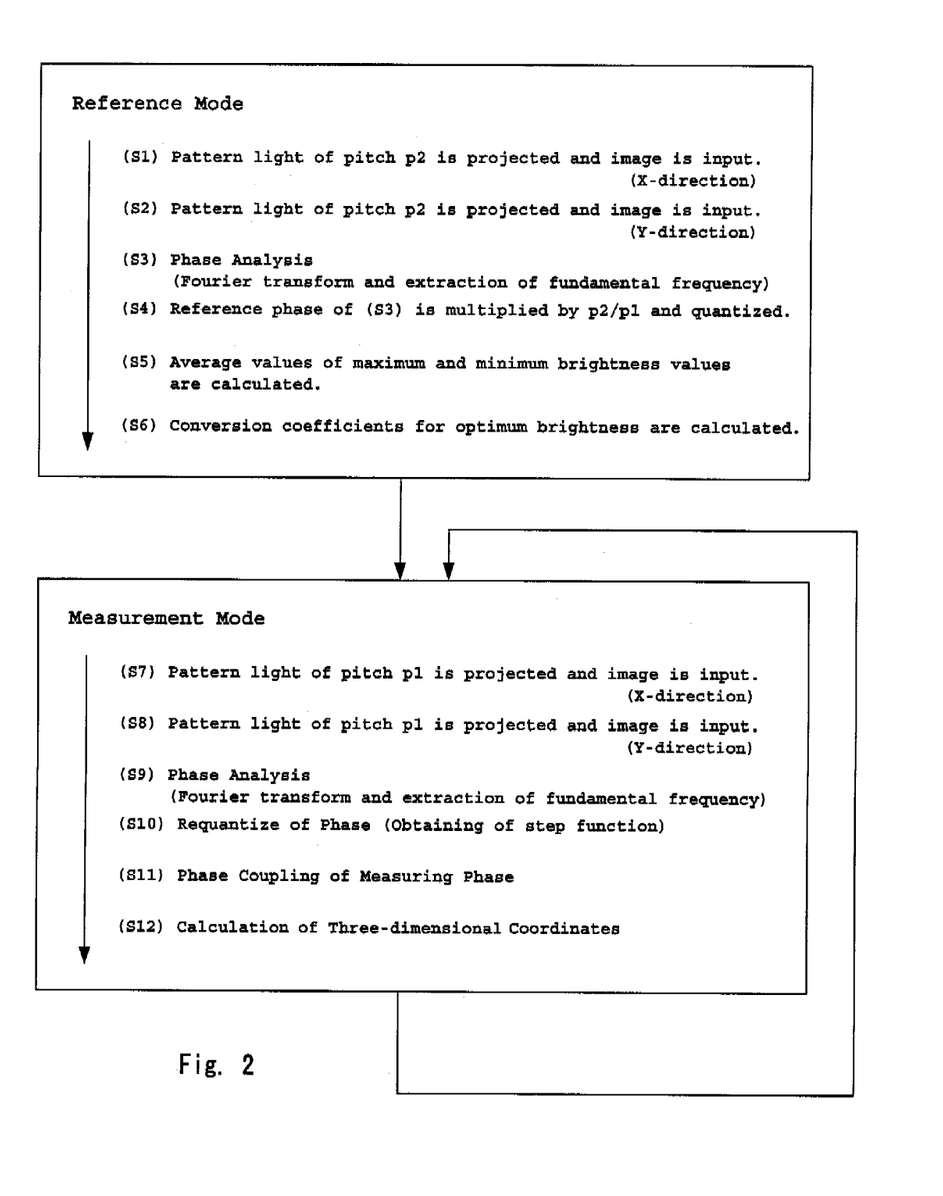
FIG. 2 is a flow chart showing the process flow for obtaining the three-dimensional shape of the sample in the phase measurement system.
Figure 3:
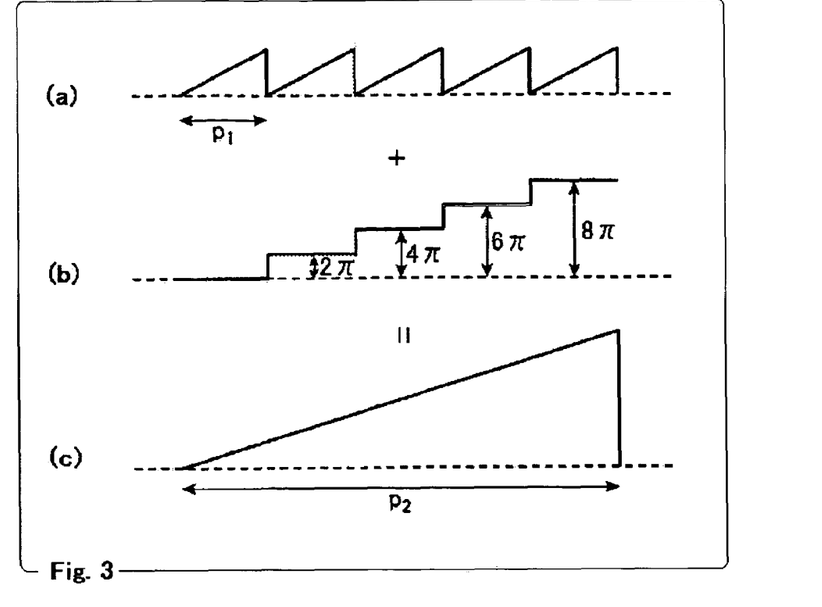
FIG. 3 is a schematic diagram illustrating the principle of phase coupling in the phase measurement system.
Figure 4:
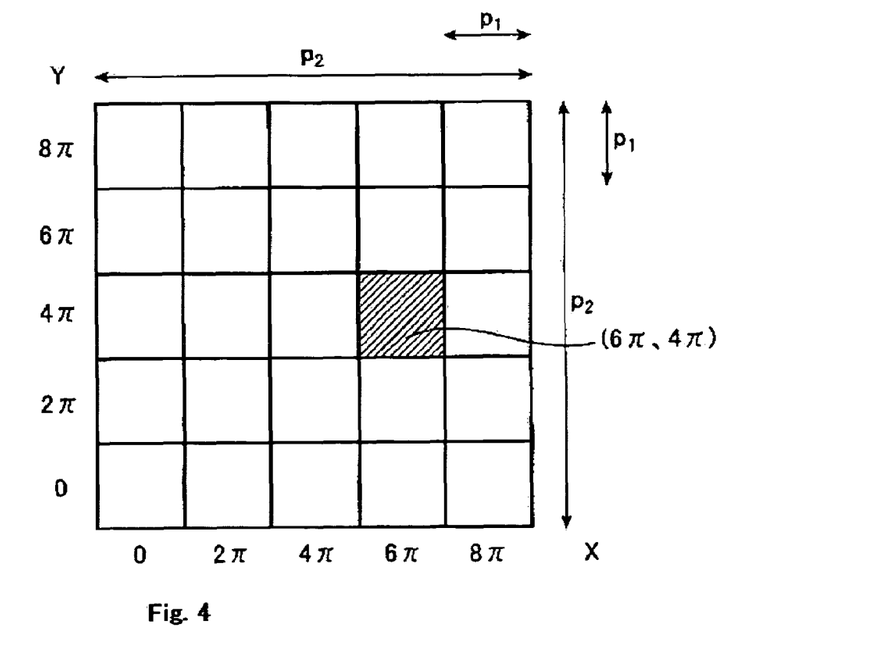
FIG. 4 is a schematic diagram showing a projector pattern in the phase measurement system.

Next, the phase of the reference phase image obtained in (S3) is multiplied by $p_2/p_1$ ($p_1$ is the pitch of the measuring pattern), after which the phase is quantized in increments of $2\pi$ ((S4) in FIG. 2). Here, examples for the case of $p_2/p_1=5$ are shown in FIG. 3 and FIG. 4. First, FIG. 3-(c) shows the example in which the phase of the reference phase image obtained from the pattern light of pitch $p_2$ is multiplied by $p_2/p_1$ (=5). In FIG. 3-($a$) ($b$) ($c$), the vertical axis corresponds to the phase, and the horizontal axis to the pixels of the camera 5. Therefore, the phase (0 to $2\pi$) of the pattern light of pitch $p_2$ is multiplied by 5 in the vertical axis direction, and the maximum value is thus $10\pi$ (=$2\pi \times 5$).

Next, the phase of FIG. 3-($c$) is quantized in increments of $2\pi$. The result is the step function such as shown in FIG. 3-($b$). The step function of FIG. 3-($b$) is shown expanded in both the X and Y directions in FIG. 4. In reality, however, the phase of FIG. 3-($c$) is not a clean straight line because of noise, etc. introduced during the measurement. As a result, the step positions tend to be displaced when the phase is quantized. That is, the lengths of the respective steps in the horizontal axis direction are not often equal to each other. However, the step function obtained here is not actually used when performing the phase coupling, but is used only for exposure control, that is, when creating the projector pattern of FIG. 4 to be described later. Therefore, there will be no problem if the step positions are somewhat displaced.

Before ending the reference mode, the minimum and maximum values of brightness are obtained for each pixel between the $N_2$ reference images. Then, for each of the image regions partitioned as shown in FIG. 4, the average values of the minimum and maximum values, respectively, are obtained over all the pixels contained in the image region ((S5) in FIG. 2). These average values respectively correspond to the brightness average values $R_0$ and $R_1$ to be described later. Using $R_0$ and $R_1$, conversion coefficients are calculated by a calculation method to be described later so that the pattern light to be projected on the sample will have an optimum brightness. The values thus calculated are stored for each image partition region ((S6) in FIG. 2). The reference mode is thus completed.

Next, the measurement mode will be described. First, pattern light of pitch $p_1$ is projected on the actual sample, that is, the object to be measured. Then, the phase is shifted successively in the X direction, and its measuring image is input ((S7) in FIG. 2). If the number of phase shifts is $N_1$, the number, $N_1$, of measuring images are obtained.

Here, the pitch $p_1$ is set equal to or smaller than the value calculated based on the phase resolution of the pattern light of pitch $p_2$. For example, when the relative resolution is denoted by a (resolution which is a times the brightness amplitude), the phase resolution of the pattern light of pitch $p_2$ has a value proportional to $\sigma/N_2$ ($N_2$ is the number of phase shifts of pitch $p_2$). Accordingly, if this level of resolution is achieved as the reference phase obtained by the pitch $p_2$, the measuring phase obtained by the pitch $p_1$ can be corrected.

That is, for any measuring phase in which phase aliasing occurs at a pitch longer than $\sigma/N_1$ times the pitch of the reference phase, phase coupling can be accomplished using the reference phase. In other words, the number of phase shifts for the pattern light having the pitch $p_2$ can be reduced to such an extent that the phase resolution of the pattern light having the pitch $p_2$ becomes smaller than the step of phase aliasing obtained by using the pattern light having the pitch $p_1$.

Next, the phase is shifted in the Y direction in like manner, and its image is input ((S8) in FIG. 2). Then, a Fourier transform is applied to the images obtained in (S7) and (S8), and the fundamental frequency is extracted ((S9) in FIG. 2). A measuring phase image is thus created. Then, the measuring phase (FIG. 3-($a$)) is subtracted from the reference phase multiplied by $p_2/p_1$ (=5), and the resulting difference is requantized in increments of $2\pi$ ((S10) in FIG. 2). Since the difference is taken here, a clean step function with no step position displacements can be obtained, unlike the step function obtained in (S4) in FIG. 2. Using the step function thus obtained, phase coupling is performed for the measuring phase ((S11) in FIG. 2). Then, the three-dimensional coordinates can be computed using known method, for example, the Fourier transform phase shift method ((S12) in FIG. 2). The Fourier transform phase shift method is described in Japanese Unexamined Patent Publication No. Hei. 10-96606, or in a paper by Morimoto, Y. and Fujisawa, M., entitled "Fringe Pattern Analysis by a Phase-shifting Method using Fourier Transform," Optical Engineering, 33(11), pp. 3709-3714, 1994.

The process flow up to the step of the phase data creation ((S1) to (S3) in FIG. 2) will be described in further detail with reference to FIG. 1. First, the shutter of the projector 6 is opened, and the X-direction reference pattern (X reference pattern) of pitch $p_2$ (0 to $2\pi$) is projected on the sample 1. Here, it is desirable that the pitch $p_2$ be set large enough to be able to uniquely determine the phase within the field of view of the camera, that is, to cover the entire field of view of the camera with one pitch. It is understood that the X reference pattern has a sinusoidally varying illuminance distribution. It is also understood that the brightness range of the X reference pattern is $[I_0, I_1]$ and the brightness resolution is about $1/n_2$. Here, if the imaging device used in the camera is a CCD or the like, since the number of grayscale levels is 256 in the case of 8 bits, $I_0$ and $I_1$ take any values between 0 and 256. The image of the X reference pattern projected on the sample is captured by the camera 5.

Next, the phase of the X reference pattern is shifted by $p_2/N_2$ in the X direction, and the resulting pattern is projected on the sample 1. Then, the image of the phase-shifted reference pattern thus projected is captured by the camera 5. Thereafter, this process is repeated ($N_2$−1) times, and X-direction reference images (X reference images) totaling $N_2$ in number are thus captured. That is, the phase is shifted in small increments, the process being repeated until the accumulated amount of the phase shift reaches one pitch ($2\pi$). If an accurate phase image is to be obtained, the phase shift amount $p_2/N_2$ should be chosen to be small.

By applying a Fourier transform to the number, $N_2$, of X reference images, a single reference phase image is obtained. This method is generally known as the Fourier transform phase shift method. Since the phase is shifted in the X direction, the resulting phase image will be referred to as the "X reference phase image".

A similar process is performed on the Y direction. That is, this time the Y-direction reference pattern (Y reference pattern) is projected on the sample 1, and phase-shifted Y reference images totaling $N_2$ in number are sequentially captured by the camera 5. By applying a Fourier transform to the number, $N_2$, of Y reference images, a single "Y reference phase image" is obtained.

Next, the phase value of each of the X and Y reference phase images thus obtained is multiplied by $p_2/p_1$, and quantized in increments of $2\pi$. Here, $p_1$ is the pitch of the measuring pattern to be described later. In this way, the reference phase image can be partitioned as shown in FIG. 4. FIG. 4 shows an example for the case of $p_2/p_1$=5. Since the pitch $p_2$ takes a range of values from 0 to $2\pi$, the total pitch is in the range of 0 to $10\pi$. For example, the phase of the hatched portion in the figure is (X, Y)=($6\pi, 4\pi$).

Next, the minimum and maximum values of brightness are obtained for each pixel between the $N_2$ reference images. Then, for each of the image regions partitioned as shown in FIG. 4, the average values of the minimum and maximum values, respectively, are obtained over all the pixels contained in the image region. The average value obtained here when the projector brightness is $I_0$ is $R_0$, and the average value obtained when the projector brightness is $I_1$ is $R_1$. Then, for each partition region of the projector pattern shown in FIG. 4, conversion coefficients for setting the optimum brightness are calculated and stored. This can be accomplished using, for example, the method described below.

As described above, the average brightness value of the camera image when the projector brightness is $I_0$ or $I_1$ is denoted by $R_0$ or $R_1$, respectively. The following relation holds between them, where a and b are constants.

$$R_0 = aI_0 + b \quad (1)$$

$$R_1 = aI_1 + b \quad (2)$$

Solving the above equations for a and b, we have $$a = \frac{R_1 - R_0}{I_1 - I_0} \quad (3)$$

$$b = \frac{R_0 I_1 - R_1 I_0}{I_1 - I_0} \quad (4)$$

Accordingly, when the minimum and maximum values defining the limits of the targeted brightness of the camera image are designated by $R'_0$ and $R'_1$, respectively, then the target can be achieved by setting the projector brightness to $I'_0$ and $I'_1$, respectively, as shown below.

$$I'_0 = \frac{R'_0 - b}{a} = cR'_0 + d \quad (5)$$

$$I'_1 = \frac{R'_1 - b}{a} = cR'_1 + d \quad (6)$$

Here, c and d are the conversion coefficients for setting the optimum brightness, and can respectively be expressed by the following equations.

$$c = \frac{I_1 - I_0}{R_1 - R_0} \quad (7)$$

$$d = -\frac{R_0 I_1 - R_1 I_0}{R_1 - R_0} \quad (8)$$

Then, for each partition region of the projector pattern shown in FIG. 4, the values of c and d are stored in the computer 10. The targeted exposure control thus becomes possible.

Thereafter, using a measuring pattern of a smaller pitch, the shape of the object is accurately determined. First, the display of the sample 1 is turned off by a signal from the computer 10. Then, the shutter of the projector 6 is opened, and the X-direction measuring pattern (X measuring pattern) of pitch $p_1$ ($=p_2/(n_2 N_2)$) is projected on the object. Here, it is understood that the X measuring pattern has a sinusoidally varying illuminance distribution. The projection patterns, including the Y measuring pattern described later, are beams of light whose brightness has been converted using the above conversion coefficients c and d. The image of the X measuring pattern projected on the sample is captured by the camera 5.

Next, the phase of the X measuring pattern is shifted by $p_1/N_1$ in the X direction, and the resulting pattern is projected on the object. Then, the image of the phase-shifted measuring pattern thus projected is captured by the camera 5. Thereafter, this process is repeated ($N_1$−1) times, and X measuring images totaling $N_1$ in number are thus captured. By applying a Fourier transform to the number, $N_1$, of measuring images, a single measuring phase image is obtained. Since the phase is shifted in the X direction, the resulting phase image will be referred to as the "X measuring phase image".

A similar process is performed on the Y direction. That is, this time the Y-direction measuring pattern (Y measuring pattern) is projected on the object, and phase-shifted Y measuring images totaling $N_1$ in number are sequentially captured by the camera 5. By applying a Fourier transform to the number, $N_1$, of Y measuring images, a single "Y measuring phase image" is obtained.

Then, the X and Y measuring phase images are respectively subtracted from the phase values of the X and Y reference phase images respectively multiplied by $p_2/p_1$, and the resulting differences are requantized in increments of $2\pi$. By thus performing requantization using the difference between the reference phase image and the measuring phase image, a stable quantized reference phase independent of the pixel position can be obtained. With the earlier described quantization alone, the step positions of the step function would tend to be displaced easily. Then, phase coupling is performed for the measuring phase by using the requantized reference phase.

Figure 5:
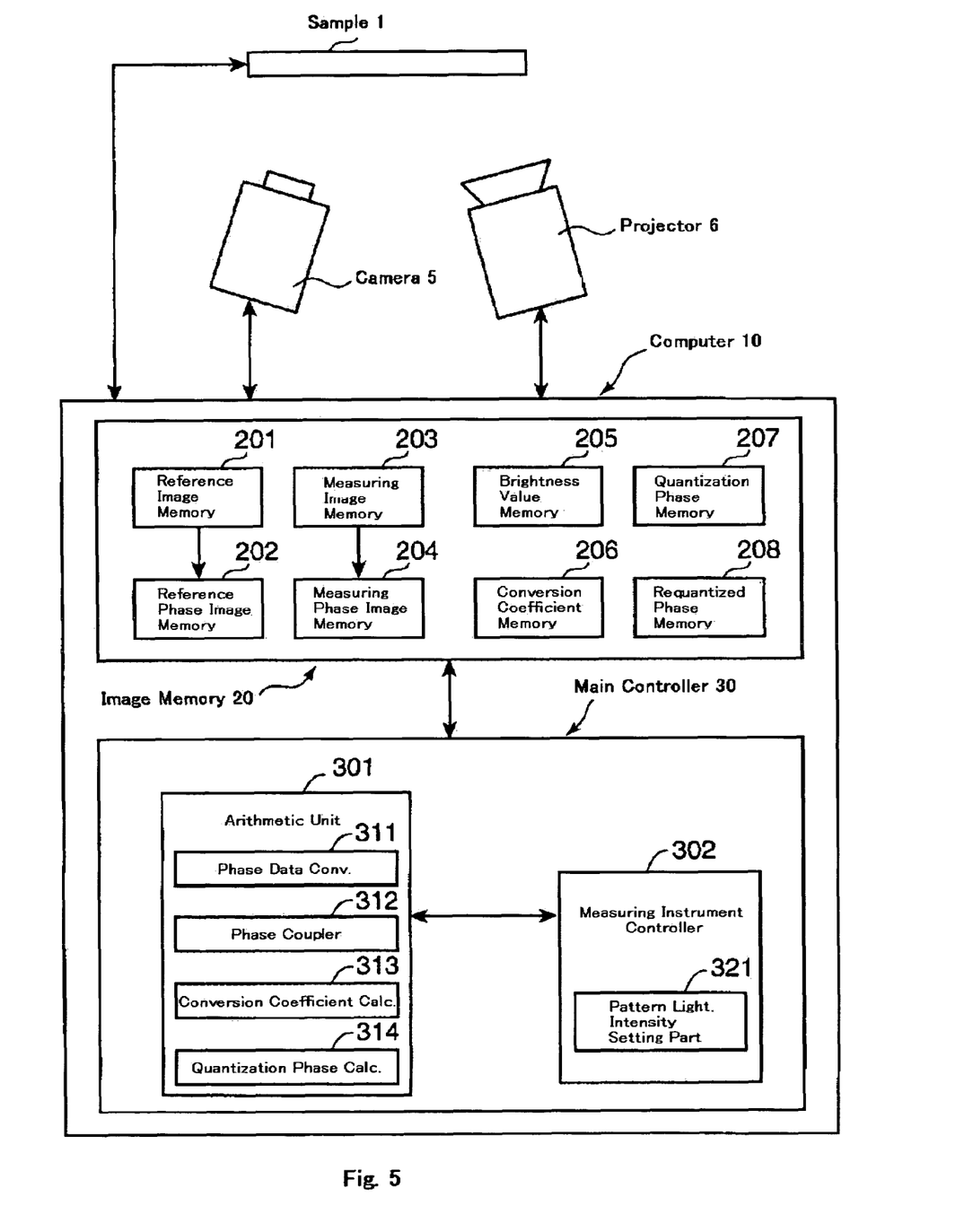
FIG. 5 is a functional block diagram of a computer in the phase measurement system.

FIG. 5 shows a functional block diagram of the computer 10 in the above-described shape measuring apparatus. The camera 5 and the projector 6 are disposed on the display part side (the lower side in the figure) of the sample 1. The computer 10 is connected to the camera 5 and the projector 6, and the operation of the camera 5 and the projector 6 is controlled by a signal sent from the computer 10. The computer 10 includes an image memory 20 used primarily to store images captured by the camera 5, and a main controller 30 which controls various parts. The main controller 30 comprises an arithmetic unit 301 which performs various arithmetic operations, and a measuring instrument controller 302 which controls measuring instruments such as the camera 5.

The process flow in the above-described shape measuring apparatus will be described in further detail with reference to FIG. 5. In the figure, the base 4 and the single-axis table 3 (see FIG. 1) responsible for driving the sample 1 mounted thereon are not shown.

First, the process of reference image capturing will be described. The measuring instrument controller 302 first sends a reference signal to the projector 6. The reference signal contains information concerning the shape, pitch, phase, projecting position, etc. of the reference pattern to be projected. Thereupon, the shutter of the projector 6 is opened, and the prescribed X-direction reference pattern is projected on the display part of the sample 1. When the measuring instrument controller 302 sends the reference signal to the projector 6, it also sends a stop signal to the sample 1. Therefore, the sample 1 which received the stop signal does not produce a pattern display. As a result, only the prescribed X-direction reference pattern (X reference pattern) from the projector 6 is projected on the sample 1.

In this condition, the measuring instrument controller 302 sends an image capturing signal to the camera 5 which thus captures the image of the X reference pattern projected on the sample 1. The captured image is sent to the image memory 20 in the computer 10 and stored in a reference image memory (first reference image memory and second reference image memory) 201 therein. At this time, image capturing intensity is stored by being associated with the pixel position on the camera 5. When the image is stored in the reference image memory 201, the measuring instrument controller 302 detects the stored condition, and sends a shift signal to the projector 6. The shift signal contains information concerning the shape, pitch, shifted phase, projecting position, etc. of the reference pattern to be projected. The reference pattern shifted in phase by $p_2/N_2$ is projected from the projector 6 that received the shift signal.

Thereafter, the same process as that performed on the first reference pattern is repeated. That is, the number, $N_2$, of images of X reference patterns, each shifted in phase by $p_2/N_2$ from the preceding pattern, are sequentially captured by the camera 5 and stored in the reference image memory 201. When the $N_2$-th display image is captured and stored in the reference image memory 201, the process for the X direction is terminated.

Next, when the measuring instrument controller 302 detects the completion of the process for the X direction, it sends a reference signal to the projector 6. Thereupon, the prescribed Y-direction reference pattern (Y reference pattern) is projected on the display part of the sample 1. Thereafter, the same process as that performed on the X direction, and the number, $N_2$, of images of Y reference patterns are sequentially stored in the reference image memory 201. When the $N_2$-th display image is captured and stored in the reference image memory 201, the process for the Y direction is terminated. The reference image memory 201 thus stores $N_2$ reference images for each of the X and Y directions, that is, a total of $2N_2$ reference images.

After termination of the reference image capturing process, the process of applying a Fourier transform for conversion to phase data starts. First, a Fourier transform is applied to the image data stored in the reference image memory 201, to convert the data to phase data. At this time, the number, $N_2$, of X display images stored in the reference image memory 201, for example, are sequentially loaded into a phase data converter 311 in the main controller 30. Then, in the phase data converter 311, the Fourier transform is applied to convert the number, $N_2$, of X reference images into a single X reference phase image.

Since a sine wave is used as the reference pattern here, the frequency obtained as a result of the Fourier transform should be one known frequency (fundamental frequency). In reality, however, frequency components other than the fundamental frequency are often obtained because of noise superimposed during the measurement of the reference images. Therefore, in this process, processing is performed to remove other frequencies than the fundamental frequency. With this processing, the resolution drop can be held within a given value. In the following process of obtaining phase data by a Fourier transform, removal of the frequencies due to noise is performed as processing attendant on the Fourier transform.

The thus obtained X reference phase image is sent to a reference phase image memory 202 where it is stored by being associated with the pixel position on the camera 5. As a result, two reference phase images, one for each of the X and Y directions, are stored in the reference phase image memory 202.

Next, quantization of the reference phase (for example, the process of obtaining the step function of FIG. 3-(b) from the reference phase of FIG. 3-(c)) is performed. First, the X and Y reference phase images stored in the reference phase image memory 202 are loaded into a quantization phase calculator 314 in the main controller 30. In the quantization phase calculator 314, the value of each phase is multiplied by $p_2/p_1$. For example, when $p_2/p_1=5$, since $p_2$ takes a range of values from 0 to $2\pi$, the total phase takes a range of 0 to $10\pi$.

Further, in the quantization phase calculator 314, the phase is quantized in increments of $2\pi$. The quantized phase value is sent out from the quantization phase calculator 314 and stored in a quantization phase memory 207. Here, the quantized phase value is stored by being associated with the pixel position on the camera 5. That is, each partition region in FIG. 4 can be identified by referring to the quantization phase memory 207.

Next, the brightness value of each specified pixel in the number, $N_2$, of X reference images is sequentially transferred from the reference image memory 201 to the arithmetic unit 301. When the number, $N_2$, of brightness values have been loaded, the arithmetic unit 301 calculates the minimum and maximum brightness values. The values thus obtained are transferred to a brightness value memory 205 for storage therein.

Then, the position of the pixel to be loaded from the reference image memory 201 is shifted, and the brightness value of each pixel at that position is sequentially transferred from the reference image memory 201 to the arithmetic unit 301. When the number, $N_2$, of brightness values have been loaded, the arithmetic unit 301 calculates the minimum and maximum values, and transfers the thus calculated values to the brightness value memory 205 for storage therein.

In this manner, the minimum and maximum brightness values of every pixel in the X and Y reference images are calculated, and stored in the brightness value memory 205. Then, the arithmetic unit 301 refers to the quantization phase memory 207 to obtain information concerning the region partitioning shown in FIG. 4 (i.e., information indicating which pixel belongs to which region). Next, for each region, the arithmetic unit 301 calculates the average values of the minimum and maximum values, respectively, over the $N_2$ reference images. In this way, for each image partition region shown in FIG. 4, the average values of the minimum and maximum brightness values, respectively, are obtained over all the pixels contained in the image region.

The average values of the minimum and maximum brightness values are denoted by $R_0$ and $R_1$, respectively. That is, the average value when the brightness of the projector beam is $I_0$, i.e., the lowest brightness, is $R_0$, and the average value when the brightness of the projector beam is $I_1$, i.e., the highest brightness, is $R_1$. Then, for each partition region of the projector pattern shown in FIG. 4, the conversion coefficients c and d for setting the optimum brightness are calculated by a conversion coefficient calculator 313 (using, for example, the method based on the equations (1) to (8)). The values calculated by the conversion coefficient calculator 313 are stored in a conversion coefficient memory 206.

The reference mode is thus terminated, and the process proceeds to the measurement mode. First, the conversion coefficients for each region of the projector pattern are transferred from the conversion coefficient memory 206 to a pattern light intensity setting part 321 in the measuring instrument controller 302. The pattern light intensity setting part 321 that received the conversion coefficients sends a measuring signal to the projector 6. The measuring signal contains information concerning the shape, pitch $p_1$ ($=p_2/(n_2N_2)$), phase, brightness, projecting position, etc. of the measuring pattern to be projected. The brightness of the measuring pattern carried in this measuring signal is one that has been converted using the above conversion coefficients c and d. Thus, the shutter of the projector 6 is opened, and the prescribed X-direction measuring pattern (X measuring pattern) is projected on the display part of the object to be measured.

When the measuring instrument controller 302 sends the measuring signal to the projector 6, it also sends a stop signal to the sample 1. Therefore, the sample 1 which received the stop signal does not produce a pattern display. As a result, the prescribed X measuring pattern from the projector 6 is projected on the object. In this condition, the measuring instrument controller 302 sends an image capturing signal to the camera 5 which thus captures the image of the X measuring pattern projected on the object. The captured image is sent to the image memory 20 in the computer 10 and stored in a measuring image memory 203 therein. At this time, image capturing intensity is stored by being associated with the pixel position on the camera 5.

When the image is stored in the measuring image memory 203, the measuring instrument controller 302 detects the stored condition, and sends a shift signal to the projector 6. The shift signal contains information concerning the shape, pitch, shifted phase, brightness, projecting position, etc. of the measuring pattern to be projected. The measuring pattern shifted in phase by $p_1/N_1$ is projected from the projector 6 that received the shift signal. Thereafter, the same process as that performed on the first measuring pattern is repeated. That is, the number, $N_1$, of images of X measuring patterns, each shifted in phase by $p_1/N_1$ from the preceding pattern, are sequentially captured by the camera 5 and stored in the measuring image memory 203. When the $N_1$-th measuring image is captured and stored in the measuring image memory 203, the process for the X direction is terminated.

A similar process is performed on the Y direction. That is, the measuring instrument controller 302 sends to the projector 6 a measuring signal that contains information concerning the shape, pitch $p_1$ ($=p_2/(n_2N_2)$), phase, brightness, projecting position, etc. of the measuring pattern to be projected. The brightness of the measuring pattern carried in this measuring signal is one that has been converted using the above conversion coefficients c and d. Thus, the shutter of the projector 6 is opened, and the prescribed Y-direction measuring pattern (Y measuring pattern) is projected on the object.

In this condition, the measuring instrument controller 302 sends an image capturing signal to the camera 5 which thus captures the image of the Y measuring pattern projected on the sample 1. The captured image is sent to the image memory 20 in the computer 10 and stored in the measuring image memory 203 therein. When the image is stored in the measuring image memory 203, the measuring instrument controller 302 detects that the image has been stored, and sends a shift signal to the projector 6. The shift signal contains information concerning the shape, pitch, shifted phase, brightness, projecting position, etc. of the measuring pattern to be projected. The measuring pattern shifted in phase by $p_1/N_1$ is projected from the projector 6 that received the shift signal.

Thereafter, the same process as that performed on the first measuring pattern is repeated. That is, the number, $N_1$, of images of Y measuring patterns, each shifted in phase by $p_1/N_1$ from the preceding pattern, are sequentially captured by the camera 5 and stored in the measuring image memory 203. When the $N_1$-th measuring image is captured and stored in the measuring image memory 203, the process for the Y direction is terminated.

After termination of the measuring image capturing process, the process of applying a Fourier transform for conversion to phase data starts. First, a Fourier transform is applied to the image data stored in the measuring image memory 203, to convert the data to phase data. At this time, the number, $N_1$, of X display images stored in the measuring image memory 203, for example, are sequentially loaded into the phase data converter 311 in the main controller 30. Then, in the phase data converter 311, the Fourier transform is applied to convert the number, $N_1$, of X measuring images into a single X measuring phase image. At the same time, processing for removing other frequencies than the fundamental frequency, such as described in connection with the reference mode, is also performed.

The thus obtained X measuring phase image is sent to a measuring phase image memory 204 where it is stored by being associated with the pixel position on the camera 5. As a result, two measuring phase images, one for each of the X and Y directions, are stored in the measuring phase image memory 204.

In the present embodiment, in both the reference mode and the measurement mode, the Fourier transform has been described as being applied after all the X- and Y-direction images have been captured and stored. However, the present invention is not limited to the above description, but the Fourier transform may be applied sequentially as the necessary data becomes available.

Next, the quantized phase value of the reference phase image is loaded from the quantization phase memory 207 into the arithmetic unit 301. Then, the phase value of the measuring phase image is loaded from the measuring phase image memory 204 into the arithmetic unit 301. The arithmetic unit 301 then subtracts the measuring phase from the reference phase. The resulting phase is requantized in the arithmetic unit 301 in increments of $2\pi$ in the same manner as shown in FIG. 3 or 4. That is, the requantized reference phase is a step function whose pitch is p1 and whose step is $2\pi$. The requantized phase value is sent out from the arithmetic unit 301 and stored in a requantized phase memory 208 by being associated with the pixel position. Using the requantized reference phase, phase coupling for the measuring phase is performed, as will be described hereinafter.

First, the requantized phase value of the reference phase image is loaded from the requantized phase memory 208 into a phase coupler 312. Next, the phase value of the measuring phase image is loaded from the measuring phase image memory 204 into the phase coupler 312. Then, in the phase coupler 312, the requantized reference phase and the measuring phase are added together. This achieves highly accurate phase coupling free from step position displacements. Then, the three-dimensional coordinates can be computed using, for example, the previously described Fourier transform phase shift method.

The description so far given has dealt with the case where a single reference pattern is used for obtaining the step function necessary for phase coupling and a single measuring pattern for accurately measuring the shape of the sample. However, as an alternative method, two or more reference patterns having different pitches may be used in order to obtain the step function more accurately. In the following description, the method so far described is extended to the method that uses a plurality of reference patterns.

The previously cited Japanese Unexamined Patent Publication No. 2001-108422 discloses the phase coupling which is performed using the following equations.

$$\varphi = \frac{\text{Mod}\left[\sum_{i=1}^{M} m_i \theta, 2\pi\right]}{p_1 \sum_{i=1}^{M} \frac{m_i}{p_i}} \quad (9)$$

$$\text{Mod}(\theta, 2\pi) = \theta - 2\pi\left[\frac{\theta}{2\pi}\right] \quad (10)$$

Here, φ is the phase after the phase coupling, θ is the phase before the phase coupling, $p_i$ is the pitch of the reference pattern (except $p_1$ which is the pitch of the measuring pattern), and $m_i$ is a prescribed weight coefficient. The symbol [ ] in equation (10) is the Gaussian symbol (indicating the largest integer that does not exceed the value in [ ]). As shown, the phase value after the phase coupling at a given point can be obtained by using only the phase value before the phase coupling at that point. In equations (9) and (10), the measuring image itself is included in the reference images (the image having the pitch $p_1$ is the measuring image), but this image may be used as a reference image.

In this case, for the pitch pattern i, a sine wave of pitch $p_i$ having a brightness resolution about $1/n_i$ of the brightness range is projected on the sample. Then, the phase of the sine wave is sequentially shifted by $p_i/N_i$ over the period of one pitch, and images of the projected reference pattern are sequentially captured. The phase shifting is performed in both the X and Y directions. The resolution of the reference phase obtained using the plurality of reference patterns is about s times the range. Here, s is give by the following equation.

$$s = \frac{\sum m_i / n_i N_i}{M} \quad (11)$$

Here, an average is taken over M values.

Accordingly, the condition should be set so that the pitch $p_1$ of the measuring pattern becomes equal to s times the combined pitch q of the reference patterns. Here, q is given by the following equation.

$$q = \frac{1}{\sum m_i / p_i} \quad (12)$$

That is, if the pitch $p_i$ is preset, the number, $N_i$, of phase shifts is determined so as to satisfy this condition. Here, Σ in equations (11) and (12) indicates the summation from the 1st to the Mth terms of i. In this way, when using a plurality of reference patterns (and a measuring pattern), by just taking an arithmetic mean it becomes possible to apply a method similar to the previously described one.

For example, not only is the first reference image obtained by projecting the pattern light having the first pitch, but a second reference image can also be obtained by projecting pattern light having a third pitch different from the first pitch. The combined pitch of the pattern lights having the first and third pitches can be obtained using the equation (12), and its phase resolution can be evaluated using the equation (11).

Then, the second pitch can be set equal to or smaller than the value calculated based on the phase resolution of the combined pitch of the pattern lights having the first and third pitches. In other words, the number of phase shifts for the pattern lights having the first and third pitches can be reduced to such an extent that the phase resolution of the pattern lights having the first and third pitches becomes smaller than the step of phase aliasing obtained by using the pattern light having the second pitch. As a result, the number of input reference images can be greatly reduced, reducing the measurement time required for each measurement.

As described above, the phase measurement system comprises: a pattern light projector; an image capturing device which captures an image of pattern light projected on a sample; a first reference image memory which stores a first reference image captured of pattern light having a first pitch; a measuring image memory which stores a measuring image captured of pattern light having a second pitch that is equal to or smaller than a value calculated based on the phase resolution of the pattern light having the first pitch; a phase data converter which converts the first reference image and the measuring image into respective phase data; a first reference phase image memory which stores a first reference phase image as representing the phase data of the converted first reference image; a measuring phase image memory which stores a measuring phase image as representing the phase data of the converted measuring image; and a phase coupler which corrects the measuring phase image based on the first reference phase image.

According to the above configuration, it becomes possible to reduce the measurement time required, for example, for the measurement of a three-dimensional shape. In the process of obtaining measurement data of the sample, the operation of projecting prescribed pattern light and capturing its image has to be performed repeatedly while sequentially shifting the phase of the pattern light. Accordingly, this process has been the most time consuming process in the measurement of a three-dimensional shape. With the above configuration, since the number of input images of the pattern light having the first pitch can be reduced to the minimum required, the measurement time for the sample can be reduced. Furthermore, since the amount of data to be stored decreases, the required memory capacity can be reduced.

The phase measurement system described above further comprises: a second reference image memory which stores a second reference image, captured by the image capturing device, of pattern light having a third pitch; and a second reference phase image memory which stores a second reference phase image as representing the phase data of the second reference image converted by the phase data converter, wherein the second pitch is equal to or smaller than a value calculated based on the phase resolution of the combined pitch of the pattern lights having the first and third pitches.

According to this configuration, first the second reference image of the pattern light having the third pitch is stored in the second reference image memory. Then, the phase data of the second reference image converted by the phase data converter is stored as the second reference phase image in the measuring phase image memory. Here, the second pitch of the pattern light is determined by the value calculated based on the phase resolution of the combined pitch of the pattern lights having the first and third pitches.

In other words, the number of phase shifts for the pattern lights having the first and third pitches can be reduced to such an extent that the phase resolution of the pattern lights having the first and third pitches becomes smaller than the step of phase aliasing obtained by using the pattern light having the second pitch. Furthermore, since the combined pitch is almost equal to the least common multiple of the individual pitches, phase coupling up to a large phase, which is difficult to achieve with a single pitch, can be accomplished.

More specifically, since the second pitch of the pattern light is determined by the value calculated based on the phase resolution of the combined pitch of the pattern lights having the first and third pitches, phase coupling up to a large phase can be accomplished. Furthermore, the use of the two pattern lights having the first and third pitches serves to enhance the measurement accuracy of the reference image.

Further, in the above-described phase measurement system, when the first reference image is obtained by shifting the pattern light having the first pitch N times, the second pitch is set at σ/N times the first pitch where σ denotes relative resolution to the brightness amplitude of the pattern light having the first pitch.

According to this configuration, if the second pitch of the pattern light is determined, then since the pitch or the number of phase shifts, etc. for the pattern light having the first pitch can be set based on the second pitch, the number of input images can be reduced to the minimum required.

That is, since the number of phase shifts for the pattern light having the first pitch can be reduced to the minimum required, the measurement time for the sample can be reduced. Furthermore, since the amount of data to be stored decreases, the required memory capacity can be reduced.

Further, in the above-described phase measurement system, the phase data converter uses a Fourier transform.

As phase analysis methods for obtaining phase data from captured images, various methods are known, examples including a Gabor transform and a Fourier transform. Among them, the Fourier transform is most commonly used, and many efficient algorithms have been developed. Accordingly, by using the Fourier transform when obtaining the phase data, the computation time can be reduced, which can further facilitate the work.

Furthermore, since frequency components due to noise can be easily removed, a high accuracy measurement with reduced noise can be achieved.

The phase measurement system described above further comprises: a quantization phase calculator which partitions the first reference image into prescribed image regions; a conversion coefficient calculator which calculates a prescribed coefficient for each prescribed image region based on the brightness of the prescribed image region; and a pattern light intensity setting part which, based on the prescribed coefficient, sets the projection intensity of second pattern light for each prescribed image region.

Accordingly to this configuration, first the quantization phase calculator partitions the first reference image into prescribed image regions. Next, the conversion coefficient calculator calculates the prescribed coefficient for each prescribed image region based on the brightness of the prescribed image region. Then, the pattern light intensity setting part, based on the prescribed coefficient, sets the projection intensity of the second pattern light for each prescribed image region; accordingly, the brightness of the pattern light to be projected on the sample can be set properly to achieve accurate measurement of the three-dimensional shape, etc. of the sample.

That is, since the projection intensity of the second pattern light is set for each prescribed image region based on the coefficient obtained from the brightness of that image region, the brightness of the pattern light to be projected on the sample is set properly to achieve accurate measurement of the three-dimensional shape, etc. of the sample.

Further, in the above-described phase measurement system, the image region partitioning by the quantization phase calculator is based on the pitch of the pattern light having the second pitch.

According to this configuration, since the brightness can be set for each pitch of the pattern light having the second pitch, the brightness of the pattern light to be projected on the sample can be set properly.

Further, in the above-described phase measurement system, the pattern light has a sinusoidally varying illuminance distribution.

When the periodic pattern projected on the sample has a sinusoidally varying illuminance distribution, ideally only the component at the position of the frequency (fundamental frequency) of the sinusoid appears in the spectrum after the phase analysis (phase conversion). In reality, however, other frequency components than the fundamental frequency also appear because of various kinds of noise superimposed during the measurement. Here, since the fundamental frequency corresponding to the measuring pattern is known, the frequency components associated with noise can be easily removed. As a result, according to the above configuration, phase calculations are facilitated, and a high accuracy measurement with further reduced noise can be achieved.

More specifically, since the periodic pattern projected on the sample has a sinusoidally varying illuminance distribution, calculations for the phase analysis performed to obtain the phase values from the captured images and the subsequent processing are facilitated. Usually, in the case of a periodic function, the frequency constituting the function can be extracted by performing a phase analysis such as a Fourier transform. However, if the function becomes complex, many frequency components appear in the spectrum after the conversion, increasing the complexity of the subsequent processing.

On the other hand, when a sine function is used, ideally only the frequency (fundamental frequency) of the sine wave appears in the spectrum after the conversion. As a result, speed-up of calculations for the phase analysis can be achieved. Furthermore, since the subsequent processing need only be performed by focusing attention on the extracted frequency, work efficiency increases. Moreover, since various kinds of noise superimposed on the measurement data appear as other frequency components than the fundamental frequency in the spectrum after the conversion, the frequency components associated with such noise can be easily removed. As a result, according to the above configuration, a high accuracy measurement with reduced noise can be achieved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A phase measurement system using a phase shift method, comprising:
    a pattern light projector which projects periodic pattern light on a sample;
    an image capturing device which captures an image of said pattern light projected on said sample by said pattern light projector;
    a first reference image memory which stores a first reference image, captured by said image capturing device, of an x direction pattern light having a first pitch and an x direction, and said first reference image memory further stores a second reference image, captured by said image capturing device, of a y direction pattern light having said first pitch and a y direction;
    a measuring image memory which stores a first measuring image, captured by said image capturing device, of first captured pattern light having said x direction and having a second pitch that is smaller than a value calculated based on the phase resolution of said x direction pattern light having said first pitch and said measuring image memory further stores a second measuring image, captured by said image capturing device, of second captured pattern light having said y direction and said second pitch;

a phase data converter which converts said first and second reference images and said first and second measuring images into respective phase data;

a first reference phase image data memory which stores a first reference phase image as representing the phase data of said first reference image converted by said phase data converter and said first reference image memory further stores a second reference phase image as representing the phase data of said second reference image converted by said phase data converter;

a measuring phase image memory which stores a first measuring phase image as representing the phase data of said first measuring image converted by said phase data converter, and said measuring phase image memory further stores a second measuring phase image as representing the phase data of said second measuring image converted by said phase data converter; and a phase coupler which corrects said first and second measuring phase images based on said first and second reference phase images.

2. The phase measurement system according to claim 1 further comprising:

a second reference image memory which stores a third reference image, captured by said image capturing device, of pattern light having a third pitch; and a second reference phase image memory which stores a third reference phase image as representing the phase data of said third reference image converted by said phase data converter, wherein said second pitch is smaller than a value calculated based on the phase resolution of the combined pitch of said pattern lights having said first and third pitches.

3. The phase measurement system according to claim 1, wherein, when said first reference image is obtained by shifting said pattern light having said first pitch N times, said second pitch is set at o/N times said first pitch where o denotes relative resolution to the brightness amplitude of said pattern light having said first pitch.

4. The phase measurement system according to claim 1, wherein said phase data converter uses a Fourier transform.

5. The phase measurement system according to claim 1, further comprising:

a quantization phase calculator which partitions said first reference image into prescribed image regions;

a conversion coefficient calculator which calculates a prescribed coefficient for each of said prescribed image region based on the brightness of said each prescribed image region; and a pattern light intensity setting part which, based on said prescribed coefficient, sets the projection intensity of second pattern light for said each prescribed image region.

6. The phase measurement system according to claim 5, wherein said image region partitioning by said quantization phase calculator is based on the pitch of said pattern light having said second pitch.

7. The phase measurement system according to claim 1, wherein said pattern light has a sinusoidally varying illuminance distribution.

8. A phase measurement system using a phase shift method, comprising:

a pattern light projector which projects periodic pattern light on a sample;

an image capturing device having a field of view which captures an image of said pattern light shaped according to a periodic function which is projected on said sample by said pattern light projector;

a reference image memory which stores a first reference image, captured by said image capturing device, of an x direction pattern light having a first pitch and an x direction whereby said x direction pattern light having said first pitch covers said field of view in its entirety with one pitch and said reference image memory further stores a second reference image, captured by said image capturing device, of a y direction pattern light having said first pitch and a y direction;

a measuring image memory which stores a first measuring image, captured by said image capturing device, of first captured pattern light having said x direction and having a second pitch that is smaller than a value calculated based on the phase resolution of said x direction pattern light having said first pitch and said measuring image memory further stores a second measuring image, captured by said image capturing device, of second captured pattern light having said y direction and said second pitch;

a phase data converter which converts said first reference image and said first measuring image into respective phase data;

a reference phase image data memory which stores a reference phase image as representing the phase data of said first reference image converted by said phase data converter;

a measuring phase image memory which stores a measuring phase image as representing the phase data of said first measuring image converted by said phase data converter; and a phase coupler which corrects said measuring phase image based on said reference phase image.

* * * * *

UNITED STATES PATENT AND TRADEMARK OFFICE
CERTIFICATE OF CORRECTION

PATENT NO. : 7,587,094 B2
APPLICATION NO. : 11/150061
DATED : September 8, 2009
INVENTOR(S) : Koji Fujiwara and Takanobu Ojima It is certified that error appears in the above-identified patent and that said Letters Patent is hereby corrected as shown below:

Column 19:
Line 36, delete "second pitch is set at o/N times said first pitch where o denotes" and insert -- second pitch is set at σ/N times said first pitch where σ denotes --.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO.      : 7,587,094 B2                                   Page 1 of 1
APPLICATION NO. : 11/150061
DATED           : September 8, 2009
INVENTOR(S)     : Fujiwara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Twenty-first Day of September, 2010

David J. Kappos
*Director of the United States Patent and Trademark Office*